United States Patent [19]

Stefanski

[11] Patent Number: 5,074,614

[45] Date of Patent: Dec. 24, 1991

[54] MOTOR VEHICLE WITH SLIDING ROOF

[75] Inventor: Andrew Stefanski, Menlo Park, Calif.

[73] Assignee: Laura M. Stefanski, Menlo Park, Calif.

[21] Appl. No.: 658,112

[22] Filed: Feb. 20, 1991

[51] Int. Cl.5 .............................. B60J 7/04
[52] U.S. Cl. ..................... 296/216; 296/102
[58] Field of Search ............ 296/216, 107, 102

[56] References Cited

U.S. PATENT DOCUMENTS

| 2,548,105 | 4/1951 | George | 296/107 |
| 3,823,977 | 7/1974 | Fioravanti | 296/107 |
| 4,168,859 | 9/1979 | Breitschwerdt et al. | 296/102 |
| 4,801,174 | 1/1989 | Hirshberg et al. | 296/216 |
| 4,950,022 | 8/1990 | Pattee | 296/216 |

Primary Examiner—Robert R. Song
Attorney, Agent, or Firm—Skjerven, Morrill, MacPherson, Franklin & Friel

[57] ABSTRACT

An automobile rigid convertible roof (4) retracts horizontally rearward over the rear part of the upper body. The rear end of the roof is supported by two external elongated struts (12L and 12R) which are permanently attached to the rear corners of the roof at their upper ends and retract with it as a unit. Strut bottom rollers (18) are guided by guides (22) mounted adjacent the vehicle rear deck. The struts (12) are outside of the vehicle cockpit enclosure. The retracted roof is moved horizontally so that the retracted roof panel does not interfere with rear vision from the cockpit and in the retracted position does not use any cockpit or vehicle trunk volume for roof storage.

10 Claims, 9 Drawing Sheets

MOTOR VEHICLE WITH SLIDING ROOF

FIELD OF THE INVENTION

The present invention relates to a retractable automobile roof, of the so-called Targa type i.e. a roof comprised of a full width panel that can be removed from its normal position over the cockpit, giving the passengers a feeling of being in an open car. In this open configuration the upper car body is completely open from side to side and only the front windshield structure and the rear window/side walls structure are left above the hood-trunk lid level. In the open position, the roof structure has no connection with the windshield structure.

BACKGROUND OF THE INVENTION

The Targa roofs in currently produced cars have to be completely detached from the car body and manually carried to a storage space in the cockpit, in the trunk or left in a garage or at home. The conversion of a current rigid Targa roof from a closed condition to an open condition involves a person unlocking the roof from the inside the car and then going outside the vehicle to lift the somewhat heavy weight roof for separate storage. If to be stored in the vehicle, the result is the loss of otherwise useful storage space behind the front seat or in the trunk. This is particularly critical since storage space in typical sports cars which employ the Targa roof is initially limited.

There are a number of prior patents which seek to allow the roof to be moved from its normal position to a storage position without the disengagement from the vehicle.

U.S. Pat. No. 4,165,122 of Bertone describes a roof panel which is pivoted upright by a system of levers and then lowered into its storage space behind the seat back and which is operable from within the vehicle. U.S. Pat. No. 4,895,409 of Konishe et al shows a roof rear panel structure which is similarly retracted rearwardly and downwardly into a storing space behind the vehicle rear seat. Guide rails, sliding plates and sliding shoes are employed. There are disadvantages to these schemes. The linkage mechanisms are complex and a large uninterrupted free space has to be left clear behind the car seats to store the roof. The retraction cannot be done at normal car speeds due to the roof's intermediate vertical position above the car body which captures the wind stream and would tend to lift and bend the retracting roof.

U.S. Pat. No. 1,722,227 of Lukesh describe a roof which slides backwards together with the whole integral rear part of the upper body including the rear window and rear side walls. After retraction, the roof and rear part of the upper body are stored above and behind the rear of the car disabling the use of a rear seat 15.

U.S. Pat. No. 4,168,859 of Breitschwerdt et al shows a similar displacement of the entire rear vehicle upper part including the rear window and sidewalls, the former being additionally lowerable into a trunk space. The disadvantage of these schemes is the fact that almost the whole upper body has to retract with the roof, affecting the structural integrity of the car body and its weather sealing properties. A strong and precise retraction mechanism has to be used, as well as complicated weather sealing.

U.S. Pat. No. 4,801,174 of Hirshberg et al describes a transparent roof panel of less than full width which slides rearward in a downward arch and is stored in proximate parallelism to the rear window, resulting in a double-pane rear window. The disadvantage of this scheme are that the construction is limited to the use of a moving glass panel since otherwise the driver's rear view would be obstructed and necessitates a curved panel which limits the design choices for a vehicle designer. Further, provision must be made to continue the ability of the rear window to be raised and lowered to provide rear access into the passenger compartment.

SUMMARY OF THE INVENTION

According to the present invention a retractable vehicle roof is provided of simple construction which is fully operable from within the vehicle. The construction does not necessitate dedication of any normal trunk space or behind-the-seat space to store the retracted roof panel. Further, the construction does not obscure the rear vision of the vehicle driver either through the vehicle cockpit rear view mirror or when looking directly rearward. Further, the vehicle rear window and vehicle upper side parts are not moved. The moving structure thus is relatively light-weight and may be moved by a drive motor with low power requirements. Alternatively, the roof panel may be moved by rotation of a rotary handle and a lead screw or a cable. The above functions are provided by mounting the retractable roof panel to the vehicle by a pair of elongated external struts or support posts which extend downwardly and rearwardly at a rake angle from the roof panel to a position immediately adjacent the rear deck of the vehicle outboard of the side edges of the trunk lid. The roof panel moves horizontally and is positioned horizontally, both in its intermediate positions and in its fully-retracted position. This contributes to the essentially no change in the vision capabilities of the driver in looking rearwardly in the open/retracted positions of the roof panel.

DETAILED DESCRIPTION

Figure 1:
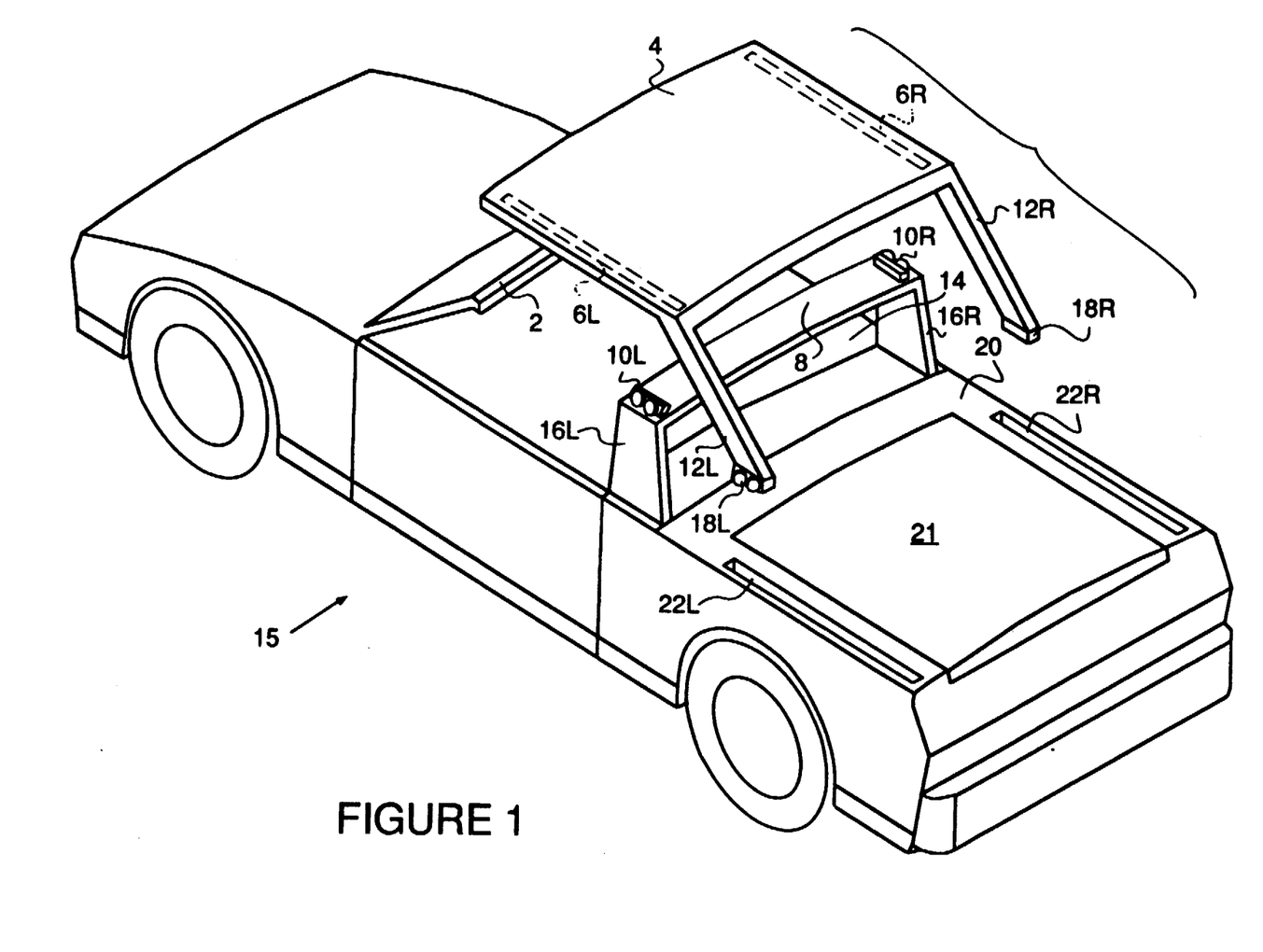
FIG. 1 is an exploded isometric schematic view of an automobile with the retractable roof of this invention.

The basic concept of the invention can be shown by distinguishing the retracting parts of the car body from the stationary ones. FIG. 1 presents a view of the car body 15 exploded into those two basic assemblies. The retractable assembly comprises the roof proper, herein called a roof panel 4 which has two external struts or support posts 12L (left) and 12R (right) at the roof rear corners. Roof panel 4 is normally constructed of sheet steel although other materials of construction such as aluminum, or plastic or reinforced fiberglass may be employed. The remainder of the vehicle rear upper part is stationary. That rear upper body includes a rear window 14, the side walls 16L and 16R and a top part 8 of the rear upper body which will be called a roll-over bar (whether it serves as such or not). In the closed position of the roof, shown in FIG. 2, the rear part of the roof panel 4 overlaps the roll-over bar 8, and during retraction (see FIG. 3) moves over it. The struts 12, which retract together with the roof panel, are not a part of the cockpit enclosure, and are external to it.

Figure 4:
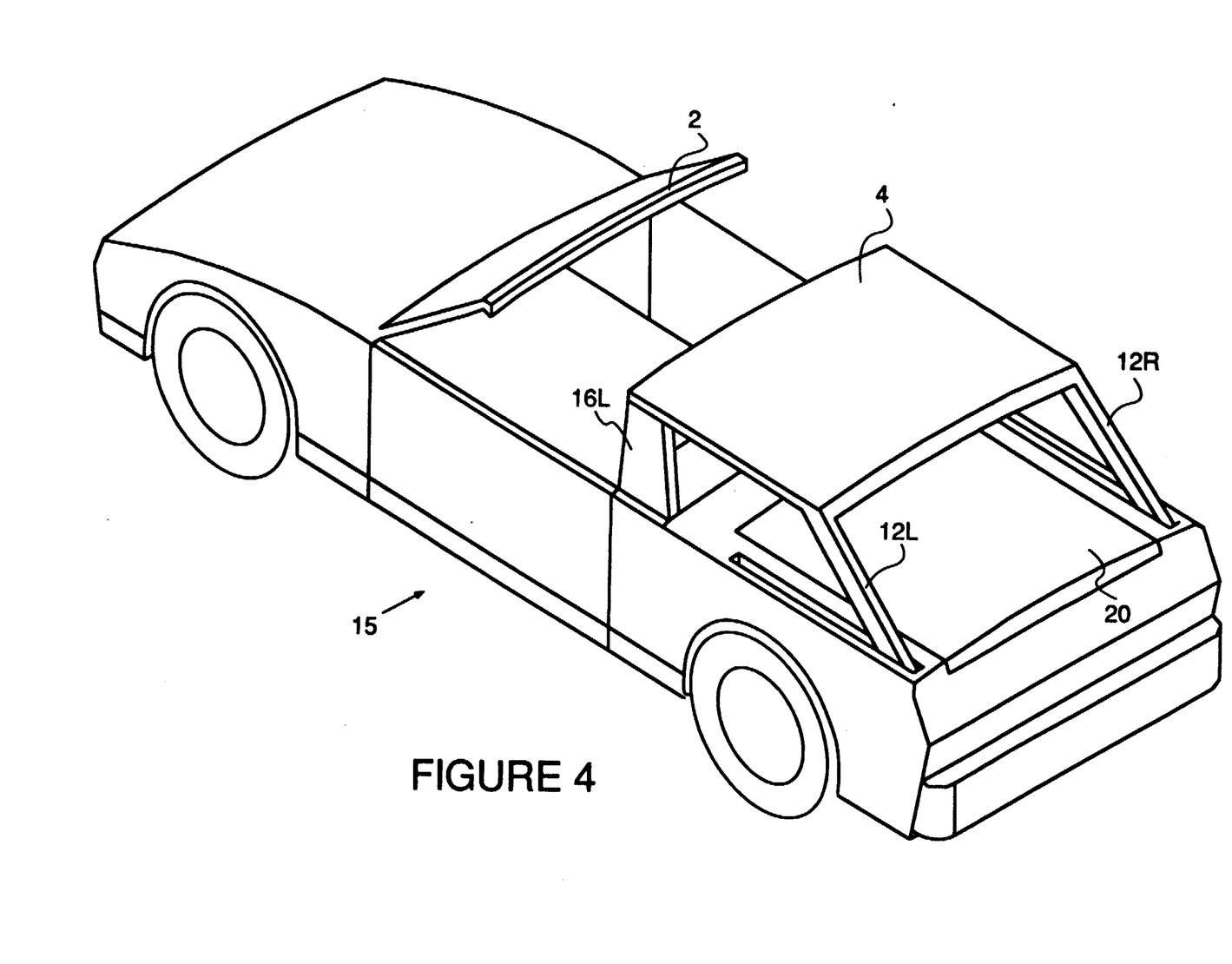
FIG. 4 is an isometric view of the automobile with its roof fully open.

The structural function of the external elongated struts 12, which are a key part of this invention, can be appreciated from FIG. 4 showing the roof in its fully open position. In that position, without the struts 12, the roof panel 4 would be supported in front but have no support in the rear. The support for the roof panel 4 and orientation of the roof so that it does not obstruct in any way rear vision through rear window 14 are the sole functions of the outrigger struts 12. The struts are external to the cockpit enclosure and do not participate in its closed position structural or weather sealing functions, and thus, the posts, mobility does not effect those functions. The struts are normally at a rake angle of about 45° to 90° sloping downwardly and rearwardly although this is somewhat dictated by aesthetic factors and other vehicle design parameters. The struts have a length which, in cooperation with the guides, is sufficient to allow for movement of the roof panel in substantially the same horizontal plane in which the panel is positioned in the cockpit closed position In the fully retracted position (FIG. 4) the roof panel 4 is essentially perpendicular to the vehicle rear window 14 (if that window is vertical) and acts as an opaque awning structure preventing sun rays from entering the rear window, while not interfering with rear vision or causing sun reflections on that rear window, unlike certain prior art devices. It is recognized that window 14 may be sloped so that the angle between window 14 and panel 4 may be different than 90°.

Except for the support of the roof panel 4, the structural function of the upper body is carried entirely by stationary parts. The weather sealing parts are mostly stationary and thus not weakened by a requirement of mobility. The exception are the seal between the roof panel 4 and the windshield frame 2, and the seals between the roof panel 4 and the roll-over bar 8. The requirement for the roof panel-to-windshield frame sealing is no different than in any detachable roof configuration.

Figure 9:
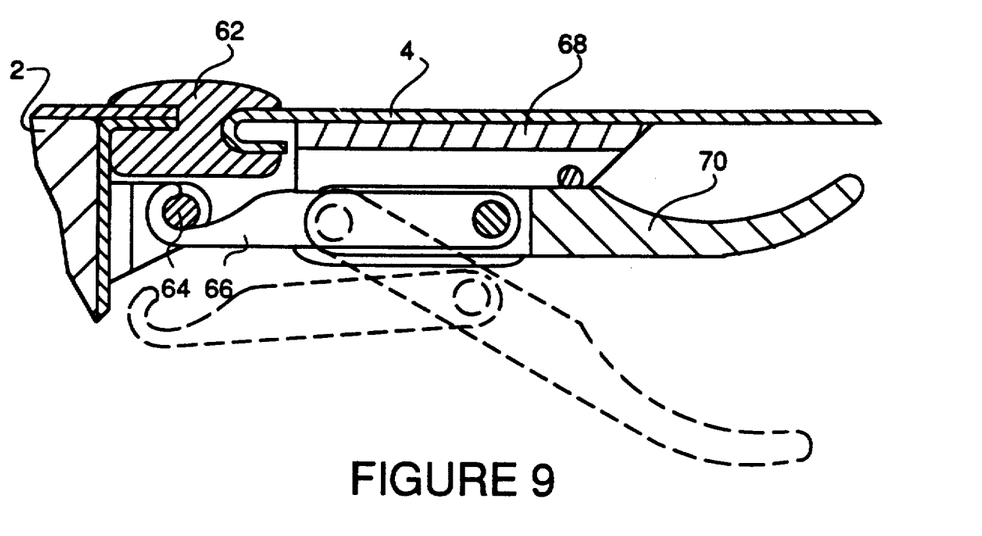
FIG. 9 is a cross-sectional view of the retractable roof front seal and locking arrangement taken on the line 9—9 of FIG. 2.

An acceptable construction is shown in FIG. 9. When in closed position, the front edge of the roof panel 4 makes a seal with a rubber gasket 62 which is permanently attached to the windshield frame 2. The sealing pressure is provided by an over-the-center latch comprising a hook 66 and a lever 70, mounted on a latch base 68 permanently attached to the underside of roof panel 4. The hook 66 can couple to a pin 64 which is permanently attached to the windshield frame 2. A transitional position of the hook 66 and the lever 70, as during latching and unlatching, is shown by the dashed line. The above described separate latching mechanism may not be necessary in automatically retracted roofs if the retraction mechanism provides the necessary sealing pressure.

Figure 10:
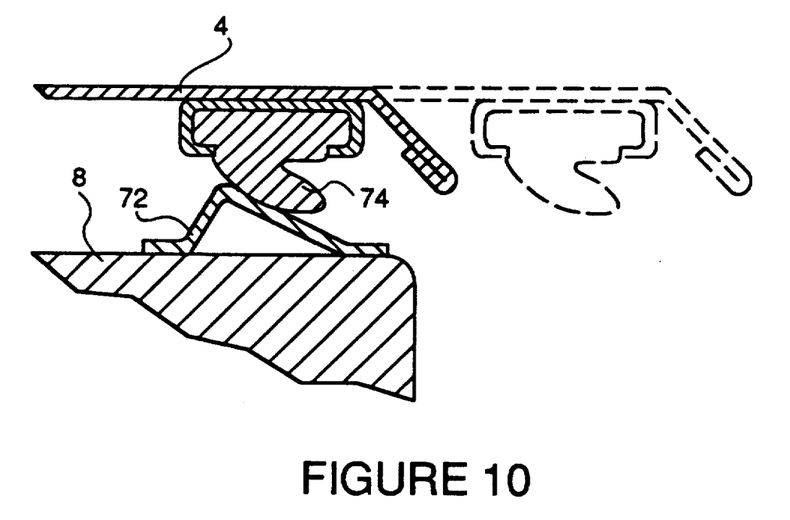
FIG. 10 is a cross-sectional view of the rear seal of the retractable roof taken on line 10—10 of FIG. 2.

At the rear of the roof, the sealing between the roof panel 4 and the roll-over bar 8 also has to allow repetitive making and breaking of the seal. Fortunately, that weather sealing can be located under the roof panel 4, in an overlap as shown in FIG. 10, and thus protected from direct exposure to the weather. The seal is made between a rubber gasket 74 and an inflexible barrier 72. The gasket 74 is permanently attached to the roof panel 4, and the barrier 72 is permanently attached to the rollover bar 8. The dashed line in FIG. 10 outlines the roof panel 4 and the gasket 74 in a slightly retracted position.

Figure 2:
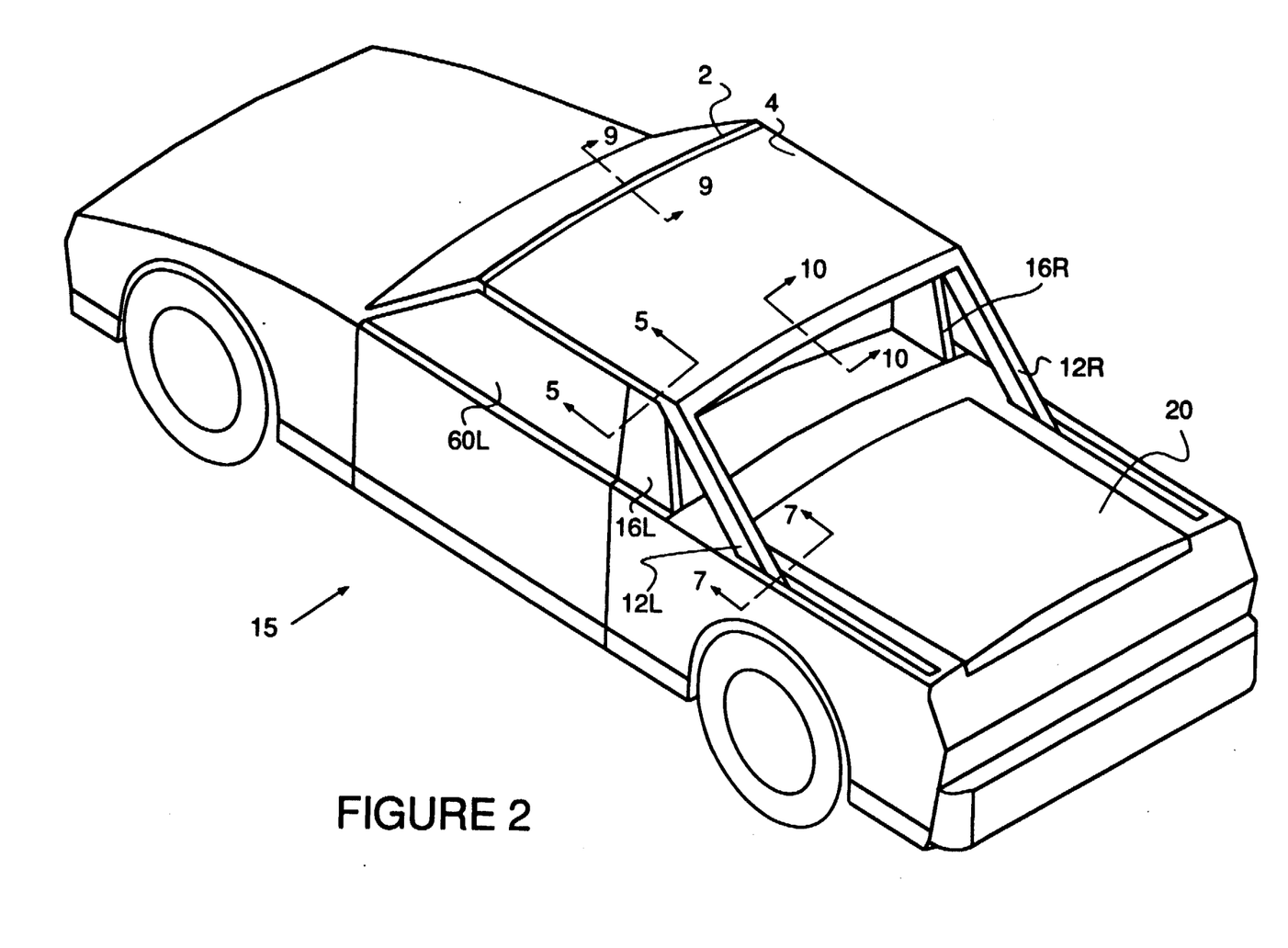
FIG. 2 is an isometric view of the automobile with its retractable roof in a fully closed position.

FIG. 2 illustrates the retractable roof panel in a fully closed position so that the roof panel is generally perpendicular to the side windows 60 of the vehicle and forms the top part of the cockpit enclosure.

Figure 3:
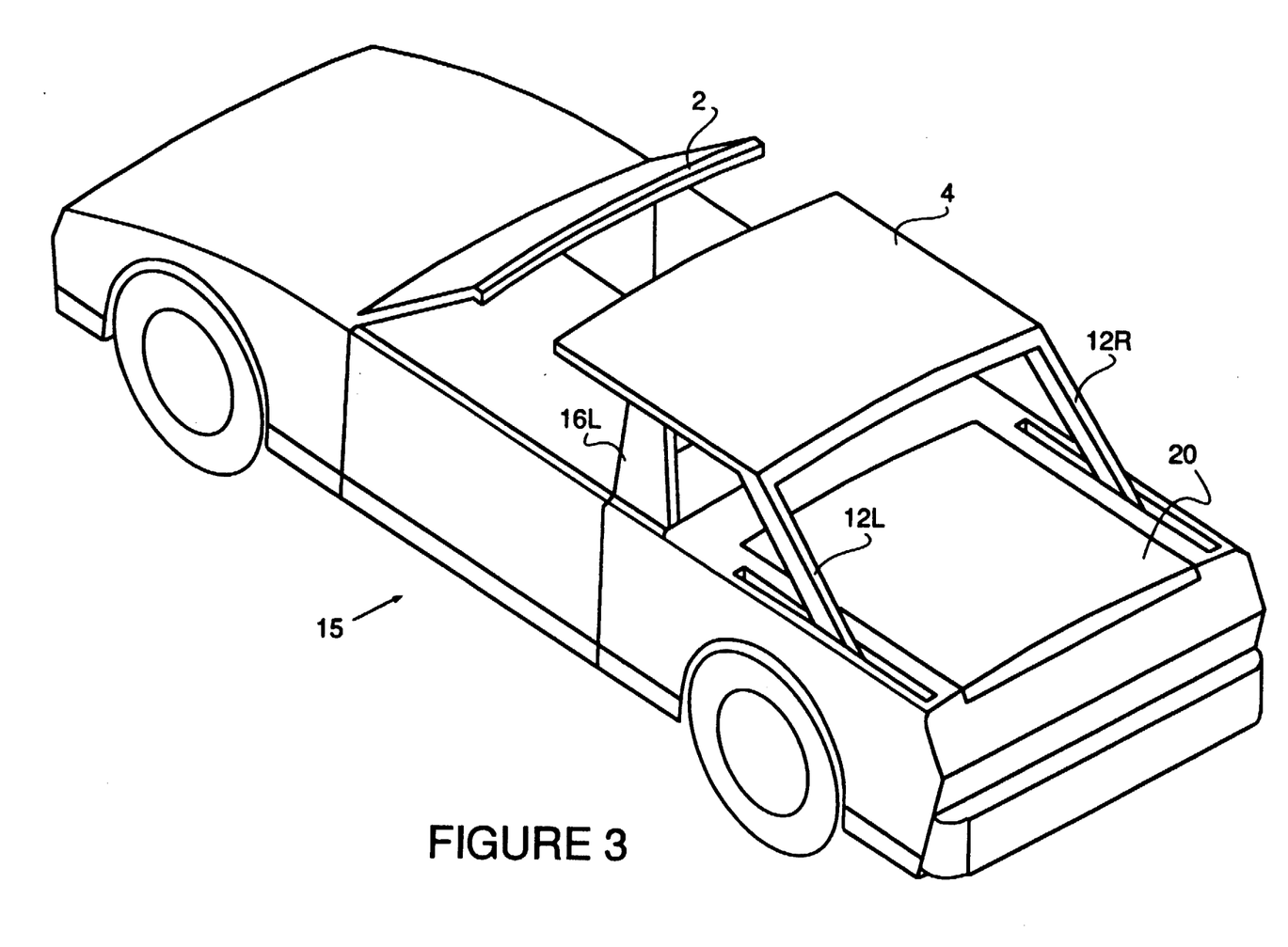
FIG. 3 is an isometric view of the automobile with its roof in an intermediate position.

FIG. 3 illustrates the roof in an intermediate position at which the roof may be locked if the user wishes more of a sun-roof sized opening. While one intermediate position is shown, an infinite number of positions are possible. The roof movement is preferably performed by the combination of a reversible electric motor and conventional cable with power train gearing or conventional lead screw (not shown) which incrementally moves the roof panel rearward or forward to retract or close the roof panel with respect to the vehicle front wind screen 2.

FIG. 4 illustrates the roof panel fully retracted in a convertible-like large open top configuration with completely open and free spaces between the struts and between each strut and a complementary fixed side panel 16 of the upper body.

The guide means for the retraction of the roof are provided by four sets of guides (FIG. 1), including rollers (or sliders) and guide-ways. There are two upper guide sets, and two lower guide sets. Each upper guide set includes a stationary roller (or slider) 10 mounted on the roll-over bar 8, and of a guide-way 6 mounted in the movable roof panel 4. Each lower guide set includes a stationary guide-way 22 mounted in or adjacent to the vehicle lower body rear deck 20 outboard of and generally parallel with the side edges of the trunk lid 21, and of a moving roller (or slider) 18 mounted at the bottom of each outrigger strut 12.

The implementation described here uses a pair of rollers in each of the guide sets. The choice of a pair rollers, rather than a single one, for the preferred embodiment was made for practical design reasons which will be described below.

Figure 5:
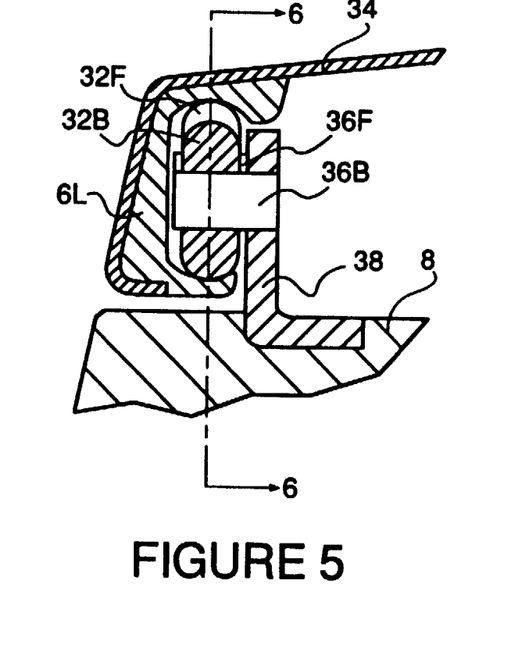
FIG. 5 is a partial transverse cross-sectional schematic view of the roof's upper left guiding mechanism taken on the line 5—5 of FIG. 2.
Figure 6:
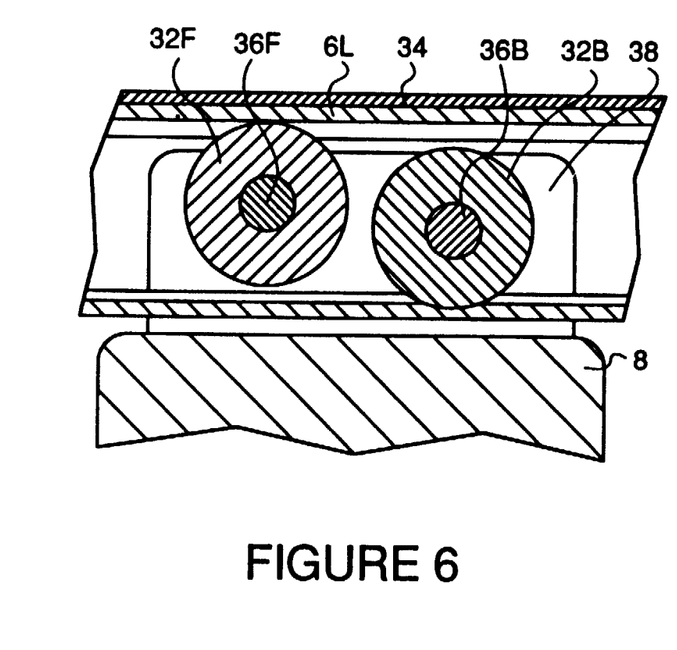
FIG. 6 is a longitudinal cross-sectional schematic view of the roof's upper left guiding mechanism taken on the line 6—6 of FIG. 5.

The details of the left upper guide set are shown in the rear cross sectional view in FIG. 5, and in the side cross sectional view in FIG. 6. The roof panel skin 34 is supported by a longitudinal channel-bar 6L. The channel-bar 6L is supported by a pair of rollers 32F (front) and 32B (back) in a way so that it can move freely longitudinally, while maintaining its vertical and lateral location. The back and front rollers 32 are rotating on front and back shafts 36, which are mounted in a bracket 38 fixedly attached by welding or the like to the top of roll-over bar 8.

Figure 7:
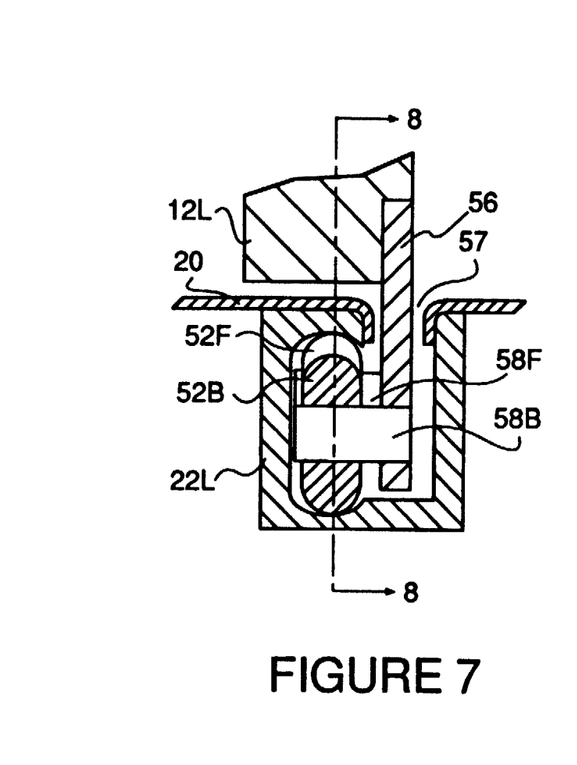
FIG. 7 is a transverse cross-sectional view of the roof's lower left guiding mechanism taken on the line 7—7 of FIG. 2.
Figure 8:
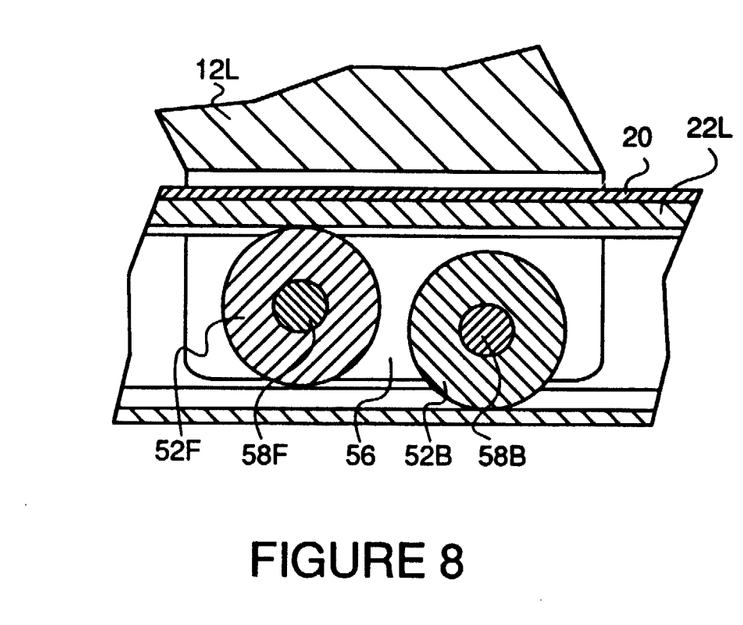
FIG. 8 is a longitudinal cross-sectional view of the roof's lower guiding mechanism taken on the line 8—8 of FIG. 7.

The details of the left lower guide set are shown in the rear cross-sectional view in FIG. 7, and in the side cross sectional view in FIG. 8. The left outrigger strut 12L includes a bottom pair of rollers 52B and 52F (Back and front) riding in a longitudinal channel of channel-bar 22L. The channel-bar 22L is mounted in the interior of the vehicle rear deck 20. The rollers 52 rotate on shafts 58B and 58F fixedly mounted in a plate 56. Plate 56 is attached to the bottom of the outrigger strut 12L by welding or the like and extends through a longitudinal slot 57 in the deck 20.

Each of the four guide sets uses a pair of rollers rather than a single roller. This provides a low rolling friction without vertical free play between the channel bar and the rollers. Both of the race surfaces (top and bottom) in channel-bars 6 and 22 respectively have to contact the rollers if vertical free-play is to be avoided. A single roller in contact with both race surfaces would not rotate freely, thus two rollers are used, each in contact with only one race surface. Free longitudinal rolling and absence of vertical or lateral free-play is achieved.

The number of the struts can vary and so the number of the upper guide sets as long as the roof is supported at least at three points and one point is at the front and one in the rear. This means that if there were two or more sets of upper guides, one strut (one lower guide set) would be sufficient. Conversely, if there were two or more struts, one set of upper guides would be sufficient. As long as the three point support requirement is satisfied, the number of struts, and the number of upper guide sets can be arbitrarily chosen.

Figure 11:
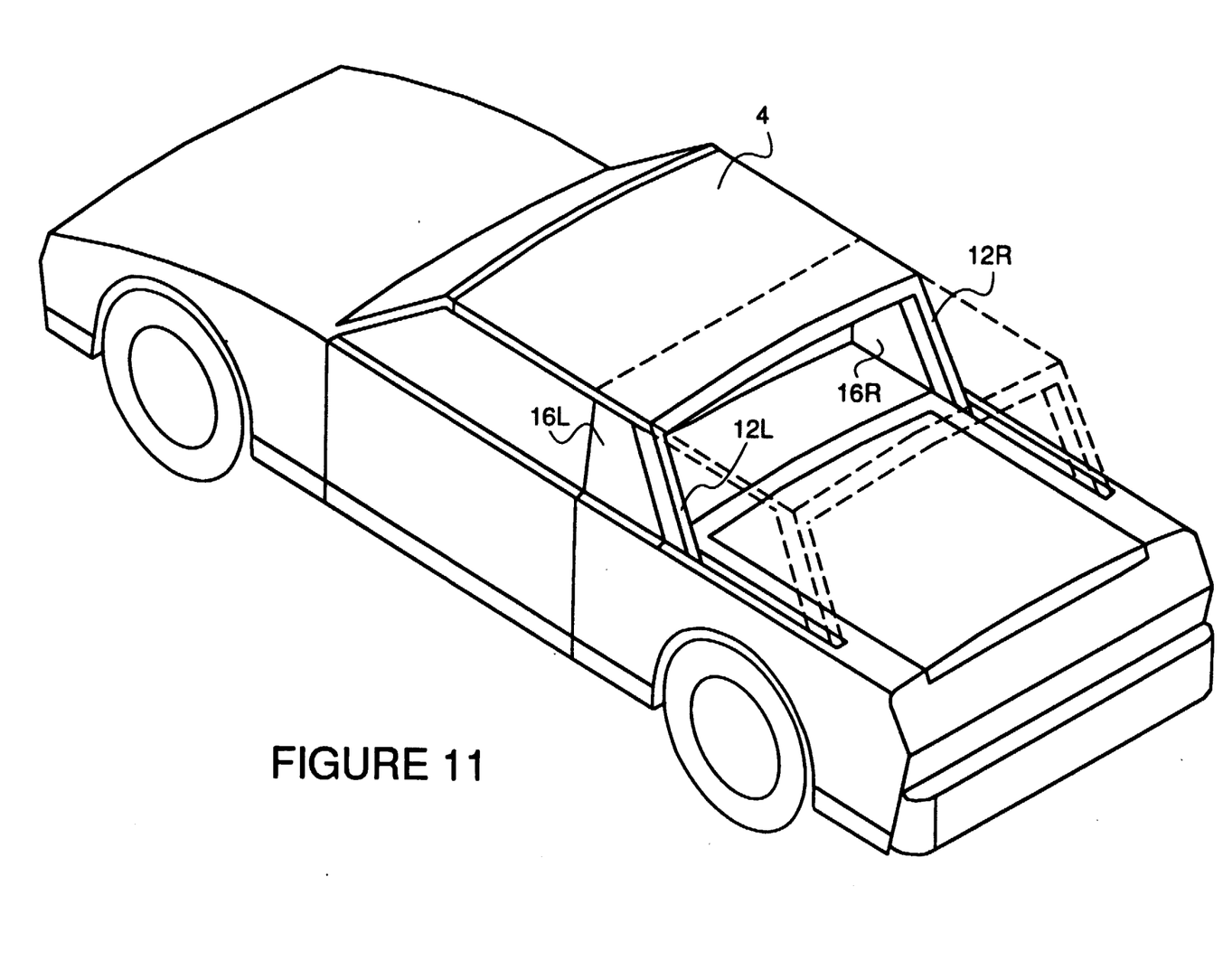
FIG. 11 is an isometric view of an additional embodiment of the retractable roof construction.
Figure 12:
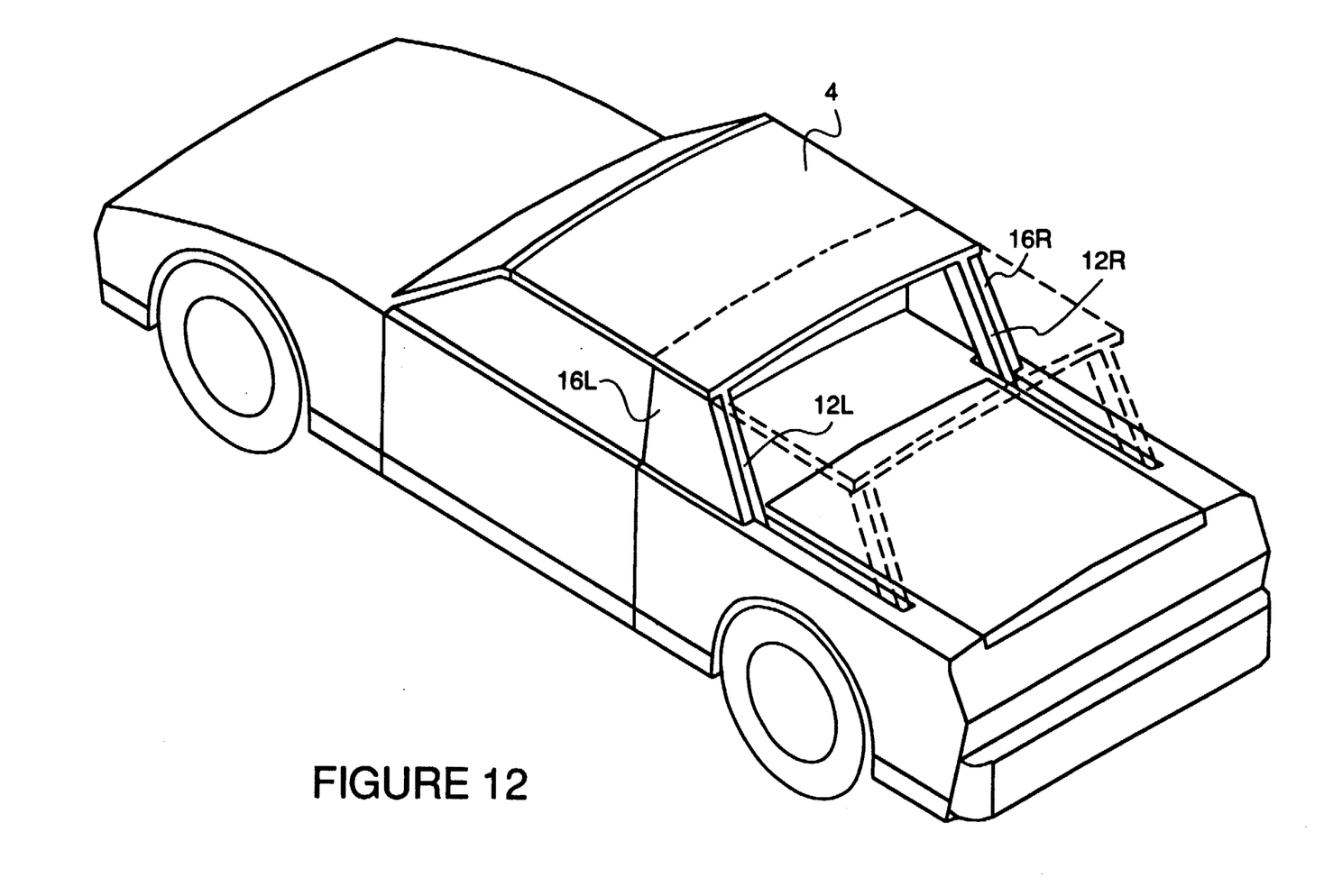
FIG. 12 is an isometric view of a third embodiment of the construction.

In order to avoid affecting the aesthetics of the vehicle, the roof struts 12 can be essentially concealed when the roof is in closed position. This may be accomplished by locating them directly to the rear of the upper body side walls 16, as shown in FIG. 11. In that location, in closed position, the struts 12 would appear to the eye as integral parts of the upper body. Alternatively, the struts 12 may be located inside extensions of the upper body side walls 16, as shown in FIG. 12. In this location, in closed position, the struts 12 would not be visible from the side.

The concept of full-height outrigger struts can be used to retract full width retractable roofs as well as to retract partial width roof panels. Retractable panels in a so-called "sun-roof" type are stored, in open position, in the rear part of the roof. If there is not enough room in the rear part of the roof, then the retractable panel could be stored behind the roof, above the trunk, supported by one or more outrigger struts. Such struts retract together with the sun-roof panel as they do in the full width retractable roof described previously. Similarly, a pair of the roof panels in the "T-bar" type of a convertible roof can be equipped with the outrigger struts to allow for their retraction and storage above the trunk of the vehicle. The panels can be retracted jointly or separately.

While mention has been made of moving the roof panel(s) by electric and manual means, other motion producing arrangement such pneumatic or hydraulic drives may be employed. While the guideway associated with the vehicle rear deck has been shown to be within the vehicle lower body, existing vehicles may be retrofitted with the roof assembly of the invention by merely fixedly mounting the channel-bar guideways 22 on the top of the deck which would obviate cutting the deck slots outboard of the trunk lid side edges.

The above description of embodiments of this invention is intended to be illustrative and not limiting. Other embodiments of this invention will be obvious to those skilled in the art in view of the above disclosure.

I claim:

1. A retractable roof assembly or a passenger vehicle having a passenger cockpit, a fixed front wind screen, a pair of fixed upper side panels, a fixed rear window between the upper side panels nd a vehicle rear deck, said roof assembly comprising:

at least one essentially horizontal roof panel movable from a a closed sealed position adjacent to the front wind screen movable to an open position rearward of the front wind screen;

at least one elongated strut fixedly connected to and downwardly extending from a rear portion of said at least one roof panel and positioned external of the vehicle cockpit;

first guide means adjacent to an upper end of a corresponding tone of the fixed upper side panels for guiding said at least one roof panel rearwardly;

second guide means associated with the vehicle rear deck for slidingly receiving a lower end portion of said at least one elongated strut and for guiding said at least one elongated strut rearwardly along the vehicle rear deck; and wherein said at least one elongated strut and said first and second guide means are operative to permit said at least one roof panel toe extend in a retracted position in an essentially same horizontal plane as in the closed sealed position, such that movement of said at least one roof panel does not interfere with rear vision from the cockpit.

2. The roof assembly of claim 1 wherein said least one roof panel in a fully retracted position is rearwardly spaced form the vehicle rear window.

3. The roof assembly of claim 1 in which a fixed roll-over bar extends between the vehicle fixed upper side panels and said first guide means is positioned on the roll-over bar.

4. The roof assembly o claim 3 in which said first guide means comprises a guideway on an underside of said at least one roof panel and a pair of rollers or sliders mounted on the roll-over bar.

5. The roof assembly of claim 4 in which said guideway includes a grooved guide channel extending on longitudinal side edges of said roof panel.

6. The roof assembly of claim 5 in which said guide channel include s atop groove and a bottom groove and wherein said paris of rollers are vertically offset such that one roller rolls in said top groove and the other roller rolls in said bottom groove such that a low friction longitudinal movement of said at least one roof panel is provided without vertical free-play.

7. The roof assembly of claim 1 wherein said second guide means comprises a guideway in the vehicle rear deck and a pair of rollers mounted adjacent the bottom of said at least one strut, said rollers being rollable in said guideway.

8. The roof assembly of claim 7 in which said guideway includes a grooved guide channel extending longitudinal of the vehicle rear deck.

9. The roof assembly of claim 8 in which said grooved guide channel includes a top groove and a bottom groove and wherein said pairs of rollers are vertically offset such that one roller rolls in said top groove and the other roller rolls in said bottom groove such that low friction longitudinal movement of said at least one roof panel is provided without vertical freeplay.

10. The roof assembly of claim 1 including a pair of elongated struts extending from rear corners of said at least one roof panel, each of said struts including a pair of rollers extending from a bottom thereof for supporting and guiding said at least one roof panel rearwardly.

* * * * *

UNITED STATES PATENT AND TRADEMARK OFFICE
CERTIFICATE OF CORRECTION

PATENT NO. : 5,074,614
DATED : December 24, 1991
INVENTOR(S) : Andrew Stefanski

It is certified that error appears in the above-identified patent and that said Letters Patent is hereby corrected as shown below:

Col. 1, line 35; delete "Which" and insert --which--.

Col. 2, line 2; delete "disadvantage" and insert --disadvantages--.

Col. 2, line 20; delete "eotly" and insert --ectly--.

Col. 3, line 36; delete comma "," second occurrence.

Col. 3, line 59; delete "seals" and insert --seal--.

Col. 4, line 56; after "pair" insert --of--.

Col. 5, line 6; delete "Back" and insert --back--.

Col. 6, line 11; delete "nd" and insert --and--.

Col. 6, line 14; delete "a", second occurrence.

Col. 6, line 22, delete "tone" and insert --one--.

Col. 6, line 31; delete "toe" and insert --to--.

Col. 6, line 38; delete "form" and insert --from--.

Col. 6, line 43; delete "o" and insert --of--.

Col. 6, line 51; delete "include s atop" and insert --includes a top--.

UNITED STATES PATENT AND TRADEMARK OFFICE
CERTIFICATE OF CORRECTION

PATENT NO. : 5,074,614

DATED : December 24, 1991

INVENTOR(S) : Andrew Stefanski

It is certified that error appears in the above-identified patent and that said Letters Patent is hereby corrected as shown below:

Col. 6, line 52; delete "paris" and insert --pairs--.

Signed and Sealed this

Fourth Day of May, 1993

*Attest:*

MICHAEL K. KIRK

*Attesting Officer*     *Acting Commissioner of Patents and Trademarks*